United States Patent

Pavilon

[15] 3,638,684
[45] Feb. 1, 1972

[54] METHOD OF REPAIRING TUBE STRUCTURES

[72] Inventor: Stanley J. Pavilon, Shaker Heights, Ohio
[73] Assignee: Arthur G. McKee & Company, Cleveland, Ohio
[22] Filed: Mar. 16, 1970
[21] Appl. No.: 19,611

[52] U.S. Cl. ..............................138/97, 29/157.3 R, 165/76, 165/178, 285/15, 29/401
[51] Int. Cl. .......................................................F16l 55/18
[58] Field of Search ..................165/76, 1, 134, 178; 285/15, 285/45; 138/97; 29/401, 157.3 R

[56] References Cited

UNITED STATES PATENTS

| | | | |
|---|---|---|---|
| 2,688,651 | 9/1954 | Blake | 285/45 X |
| 2,858,114 | 10/1958 | Parris | 165/134 |

*Primary Examiner*—Albert W. Davis, Jr.
*Attorney*—Bosworth, Sessions, Herrstrom & Cain

[57] ABSTRACT

A method for repairing tubes that, during use, develop on the tube surfaces contaminating layers that prevent joining of new tube sections, as in fluid circulating heat transfer installations for chemical reactors. At least two surrounding protective sleeves are initially joined as by welding, to a tube at spaced locations on the tube to protect underlying portions of the tube from development of such layers. If a defect occurs between the sleeves, the defective tube may be removed by cutting through the sleeves and the tube underneath, removing the cut tube section, removing the remaining cut sleeve portions from the adjacent tube ends, and then joining a replacement tube section to the portions of the unremoved tube that were protected by the sleeves, preferably with new sleeves fixed in place over the resulting joints.

5 Claims, 7 Drawing Figures

INVENTOR.
STANLEY J. PAVILON
BY
BOSWORTH, SESSIONS
HERRSTROM & CAIN
ATTORNEYS

METHOD OF REPAIRING TUBE STRUCTURES

BACKGROUND OF THE INVENTION

This invention relates to the repair of tubes and more particularly to the repair of a defective tube where, because of conditions to which the outer tube surface is exposed in service, the tube has become coated with an external contaminating layer that is not capable of being joined, as by a fusion process such as welding, without extensive surface preparation to remove the layer.

Such tubes are often used in chemical reactors utilizing fluidized beds containing reactants and if desired, finely divided catalytic agents. Certain types of reactions performed in such equipment require heat transfer means to maintain the desired reaction temperature. For this purpose heat transfer fluid is usually circulated through tubes arranged in the reactor chamber in sinuous or coiled sections, usually welded to supply and return manifolds to form assemblies. Often, layers or bundles of these assemblies are closely arranged in stacked relation in the reaction chamber.

In some services the reactants in the reactor chamber react with the metallic outer surfaces of the tubes, so the tubes become coated with a material that makes it impossible to weld or otherwise fusion join metal to the outer surface of the tube metal without removing the coating. One particularly detrimental type of such reaction at the tube surface that occurs in certain services is nitriding, wherein the metal tubing becomes corroded with a hard, brittle coating of an iron nitride that prevents welding or other fusion joining. If it should be attempted to remove such coating to provide clean metal for welding or other fusion joining, the tube would be so weakened at the cleaned portion as to lack sufficient strength or safety for service. Therefore if replacement of a damaged or defective length of tube is required it cannot be accomplished in a practical sense by cutting out the damaged section and welding in a replacement section.

Therefore, in order to make tube repairs possible in such apparatus it has been heretofore necessary to construct the reactor chamber of removable sections demountably joined as by bolting at flanges, to permit substantial disassembly of the reactor, removal of one or more entire tube assemblies containing a defect, discarding of the entire assembly containing the defect, and replacement of the entire assembly containing the defect with a new assembly. Such a new assembly can be very costly; in large reactors such an assembly may cost thousands of dollars. In such case an entire bundle of tubing including supply and return manifolds must manually be removed, disassembled, reassembled, with the new assembly in place, and replaced when repair is required, even if only a single tube is defective. This procedure is cumbersome, time consuming, and adds to initial cost of the reactor as well as to the cost of repairs by use of a costly complete replacement assembly.

The present invention greatly reduces the above costs and difficulties and affords other advantages heretofore not obtainable.

SUMMARY OF THE INVENTION

In apparatus of the invention the tube structure to be located in an environment, as in a reactor chamber, where such an undesirable coating can occur is formed of at least one length of tube, usually connected to supply and return manifolds, having at least two protective sleeves joined, as by welding, to the tube at spaced locations on it. Each sleeve surrounds and is preferably radially spaced from the tube, and the opposite ends of each sleeve are joined, preferably by frustoconical portions, to the exterior surface of the tube, so that the portion of the exterior surface of the tube beneath the sleeve is completely sealed by the fluid-impervious sleeve and its fluid-impervious joints to the tube from the surrounding environment and thus protected from reaction or corrosion; when exposed it can be readily welded or otherwise fusion joined to a replacement tube length.

This structure permits repair of a defective section of tube between two sleeves without disassembly of the reactor vessel and removal of an entire bundle or assembly of tubing therefrom. The repair may be accomplished in the reactor chamber according to the method of the invention described below.

According to the method of the invention, a tube structure of the type described above comprising two protective sleeves joined over tube surface portions, between which sleeves there is a tube defect such as a leak, is repaired by first making a transverse cut between the ends of each sleeve that are joined to the tube, through both the sleeve and the tube, and the cut section of tube containing the defect is removed from the remainder of the tube. The sleeve portions on the remaining tube are then preferably cut away so as to expose a length of protected, unreacted exterior surface adjacent each cut end of the remaining tube. Then a replacement section is joined, as by a fusion joining such as welding, in place between the cut ends of the remaining tube, using the clean protected tube surfaces in making the joints.

In a preferred method, a new sleeve is also installed over each of the two new joints, as by welding, to provide continued protection of the underlying unreacted surfaces of the tube at these locations to make possible repair of future defects between such locations.

DESCRIPTION OF THE PREFERRED EMBODIMENT

Figure 1:
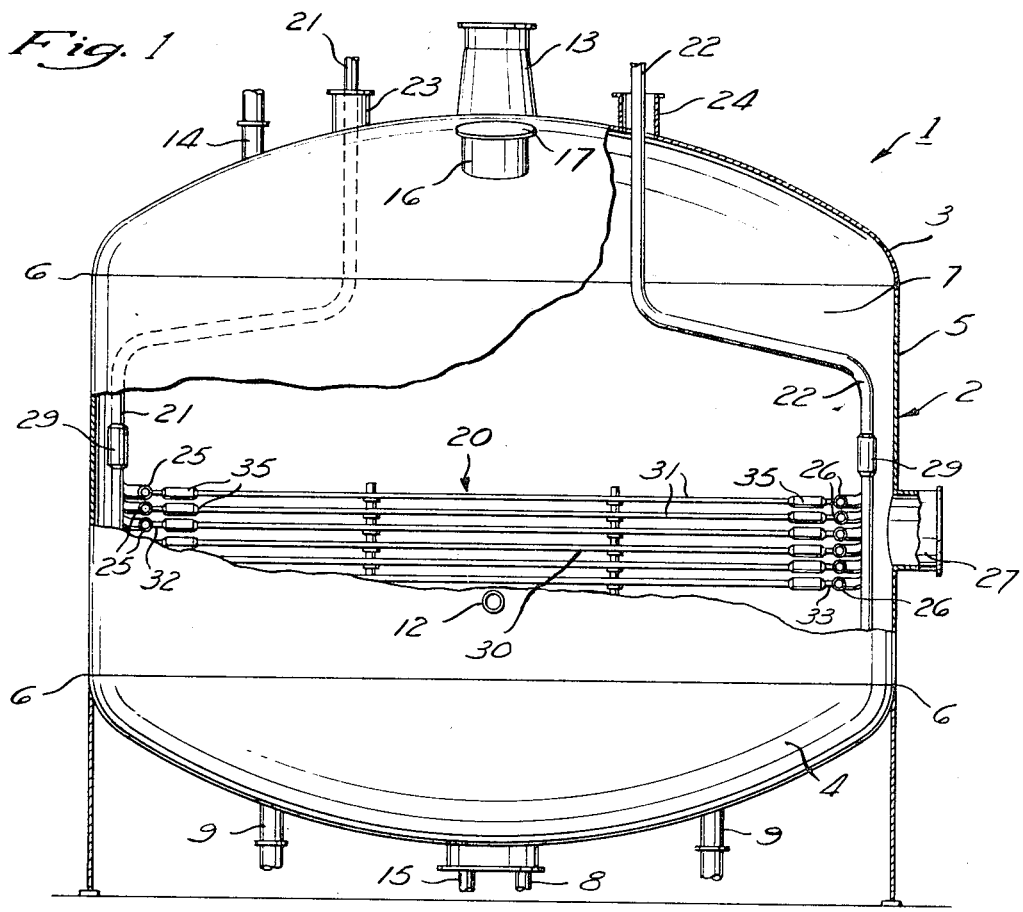
FIG. 1 is an elevational view of a reactor with parts broken away and shown in section to reveal bundles of tubes within the reactor for circulating a heat transfer fluid.

In the drawings, FIG. 1 shows an apparatus in which the invention may be advantageously used, for producing a gaseous chemical product by a fluidized bed process. The apparatus of FIG. 1 includes a reactor 1 comprising a shell 2 made up of upper and lower sections 3 and 4 welded to an intermediate section 5 at seams 6 to provide a fluidtight joint at the pressures used. Because of the invention, it is not necessary to utilize conventional construction comprising shell parts that are bolted together, and thus possibilities of leakage at the joints is eliminated.

The shell 2 defines a reactor chamber 7, having at its bottom spaced conduits 8, 9 for introducing a gaseous reactant, and having one or more horizontal conduits 12 for introducing another fluid reactant. The shell 2 also has at its top a conduit 13 through which the gaseous reaction product is discharged.

Finely divided fresh catalyst is introduced through inlet conduit 14 and spent catalyst is discharged through outlet conduit 15. In the chamber 7 catalyst particles are suspended in a fluidized bed by the fluid reactants and gaseous reaction product. The techniques for maintaining such a bed and carrying out the reaction are known, and form no part of the invention.

A manway 16, provided with removable cover 17, is provided at the top of the reactor to permit access for assembly of or repair of internal parts in chamber 7. According to the invention, repairs may be made to the below-described tubes within the reactor chamber without taking the reactor shell apart. Another manway 27 is located the side of the reactor.

Located within the reactor chamber 7 is a tube structure 20 or group of tube assemblies for circulating a heat transfer fluid to maintain a desired temperature for the particular reaction. The reaction for example, may be endothermic so that the heat transfer fluid must be a heating fluid to maintain the desired reaction. Molten salt for example may be used as the heat transfer fluid in some cases.

The tube structure 20 includes vertical inlet pipes or risers 21 and also vertical outlet pipes or risers 22 which as indicated in FIG. 1 extend from opposite sides of the reactor chamber 7 to riser access ports 23 and 24 respectively. The access ports 23 and 24 are sealed when the reactor 1 is in use. The risers 21 and 22 are connected to fluid supply means including pumps (not shown).

Each inlet riser 21 is connected to one of the inlet manifolds 25 and each outlet riser 22 is connected to one of the outlet manifolds 26. Each riser 21 and 22 has a protective sleeve 29 which is welded at its ends to the surface of its riser adjacent the lower end of the riser. The sleeves 29 permit cutting and rewelding, so that the ends of the risers may be separated from and reconnected to manifolds 25 and 26 when repairs are to be made according to the method of the invention as described below.

Figure 2:
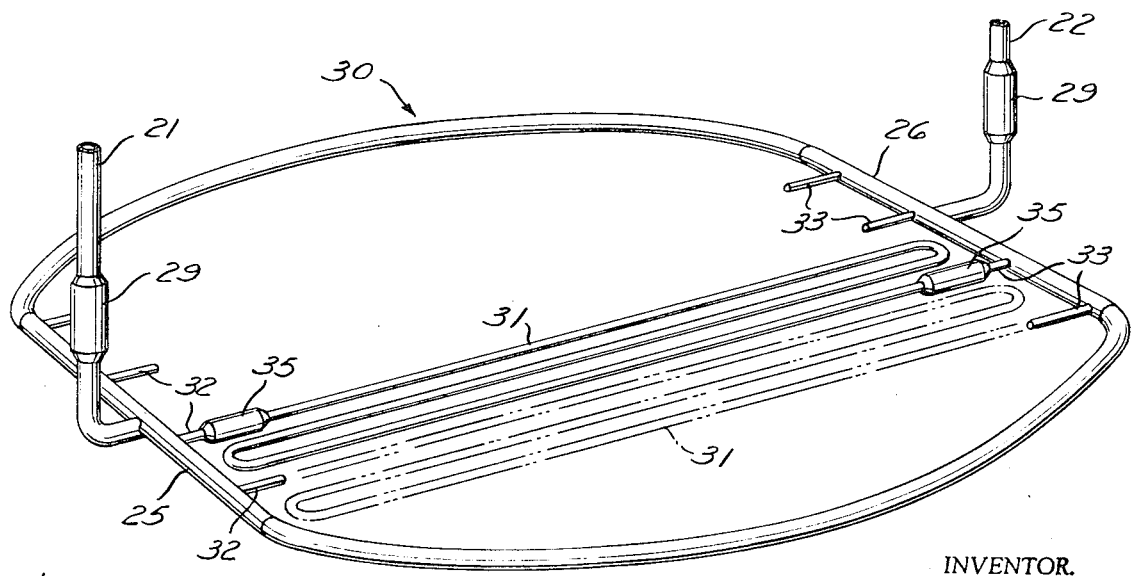
FIG. 2 is a perspective view showing one layer or assembly of the tube bundle.

Each opposite pair of inlet and outlet manifolds 25 and 26 is associated with a tube assembly or layer (FIG. 2) of which six are shown, one of which, identified by the number 30, is illustrated in perspective in FIG. 2. Each layer comprises a plurality of tube sections 31 which in the embodiment shown are of sinuous form so as to make three passes back and forth between the opposite manifolds 25 and 26. Each tube section 31 is connected at one end by a welded butt joint 36 to a tubular stub 32 extending from supply manifold 25, and at its outer end to another stub 33 extending from outlet manifold 26.

Figure 3:
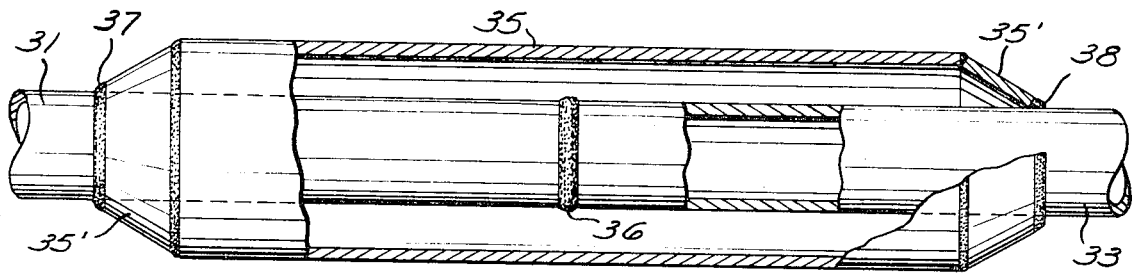
FIGS. 3 to 7 are elevational views with parts broken away and shown in section to illustrate sequentially the method of the invention.

In accordance with the invention, two sleeves 35 are positioned over the joints between the tube section 31 and the stubs 32 and 33 so as to cover substantial portions of the surfaces at the adjoining ends of the tubular stubs and the section 31. The opposite ends of each sleeve 35 are welded to the surfaces of the respective tubular stubs and the tube section, as indicated by numerals 37 and 38 shown in FIG. 3, to provide a tight seal. With this arrangement the surface portions at the ends of each stub 32 or 33 and the adjoining tube section end are protected from the action of reactants in the reaction chamber 7. Such reactants in some services react with the metal on the surface of the tubing to form a coating that makes welding impossible and that if removed by grinding or otherwise harmfully weakens the metal. Preferably, each sleeve 35 has tapered, preferably frustoconical ends 35' that decrease in size to the tube from a larger major portion of the sleeve, the inner diameter of the major portion of each sleeve being sufficiently greater than the outer diameter of the tube so that a protected annular space is defined within each sleeve 35 between its inner surface and the tubing and so that the metal under the sleeve is completely protected against formation of the above-indicated coating. The annular space also prevents undesired stresses between the sleeve and tube, and the tapered ends aid in this and also make it easier to remove the sleeve from the tube when desired.

REPAIR PROCEDURE

For the purpose of disclosing a typical repair procedure in accordance with the method of the invention, it will be assumed that a defect occurs in one of the tube sections 31 of the layer 30. Referring to FIG. 1 it will be seen that the assembly or layer 30 is the fourth layer down from the top of the six layers of the illustrated tube structure 20. Accordingly, in order to permit access for a repairman, the three layers of tube sections above the layer 30 must be raised sufficiently to provide working space for the repair operation. To accomplish this the inlet and outlet risers for the three layers above the layer 30 are cut free from their respective inlet and outlet manifolds 25 and 26 by cutting through the riser sleeves 29. If desired, the cut risers 29 may be removed through the respective riser access ways 23 and 24 or else may be merely raised high enough to provide sufficient overhead clearance.

When this is done the three assemblies or layers above the layer 30 may be raised up at one end or both ends sufficiently to permit access to layer 30 for repair. Then a repairman may enter through the manway 27.

Figure 4:
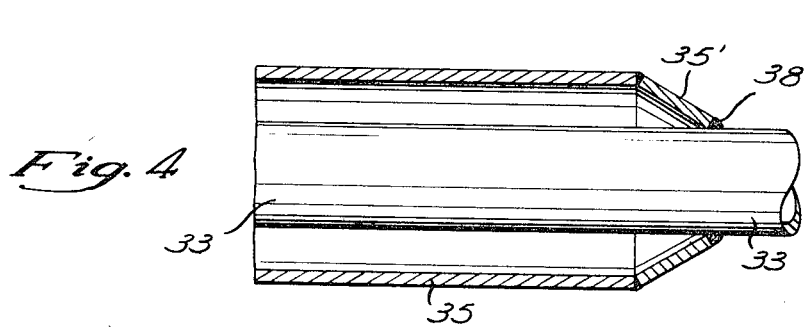

Repair of a defective tube section 31 can then be undertaken. According to the invention (FIGS. 3-7) the defective section 31 is cut free of the layer 30 by making a transverse cut through the central portion of each of its sleeves 35 and through the underlying tube. Once the cut is completed the defective tube section is removed through the manway 27. The result is apparent from FIG. 4, which shows a portion of the tubular stub 33 carrying the remaining portion of cut sleeve 35. In this case the cut was made through the tubular stub at a location closely adjacent the initial weld joint so that the old weld metal is removed with the defective tube section.

Figure 5:
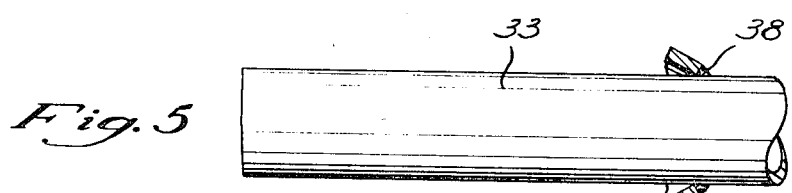

Thereafter, the severed sleeve portion that remains on the tubular stub 33 is cut away to leave only a scrap ring 39 formed of the remainder of end portion 35' of the sleeve, as indicated in FIG. 5. This exposes essentially all the protected portion of the tubular stub 33 which, because it was protected from the reactants in the reactor chamber, has its outer surface clean and free of any reaction product or coating that formed on unprotected surfaces of the tube. The ring 35 is then preferably largely if not entirely removed, as by grinding, to remove any metal or corners that could cause undesired thermal stressing or cracking of the tube. The stub 32 from the which the outer end of defection section 31 is similarly treated.

At this time, a replacement tube section 40 is introduced into reactor chamber 7 through the manway 27 and is suitably positioned with its opposite ends abutting the ends of the tubular stubs 32 and 33. These abutting ends are then fully welded as indicated at 41 (FIG. 6) to place them in proper alignment and form a tight joint between the old and replacement sections of the tube.

Figure 6:
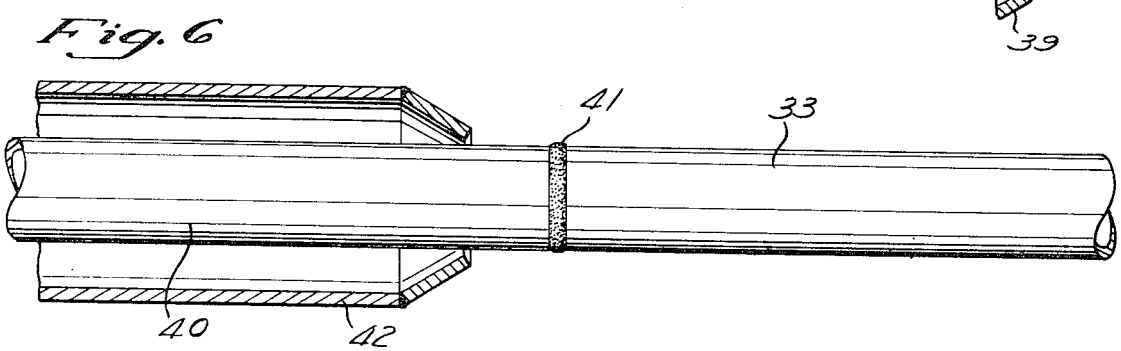
Figure 7:
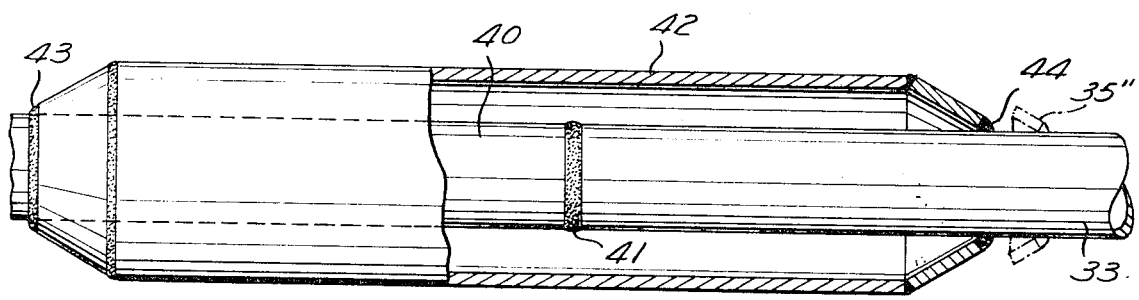

According to the preferred practice of the invention new sleeves 42 will have been placed on the replacement section 40 before the new section is positioned and welded, and after the welding is completed each new sleeve 42 is moved from its initial position illustrated by FIG. 6 over its associated tube joint 41 to its final position illustrated by FIG. 7. The ends of the sleeve are then welded by a full fluid-impervious weld to the underlying outer clean surfaces of tubing end portions, as illustrated by the numerals 43 and 44 (FIG. 7) thus completely the repair. It will be noted that each replacement sleeve 42 is positioned slightly inward of the position taken initially by the end 35' of the original sleeve 35 indicated in broken lines 35'' in FIG. 7, to space the location of the weld 41 from any prior weld metal from the old sleeve 35 and insure that the new sleeve will be welded to clean, protected metal on the old tube portion. Several subsequent replacements for the same tube section can be made according to this procedure, probably many more than would ever be required during the life of the reactor.

After the repair is completed the raised layers above the layer 30 are sequentially lowered into their proper places and their respective risers 21 and 22 are rewelded with new sleeves 29 thereon according to the same general procedure described above with respect to the replacement of a tube section. The replacement riser sleeves 29 will preferably be shorter than the original sleeves because of the shorter surface area available for welding. Once the layers have all been relocated and their respective risers welded in place the reactor will be ready for use.

While the invention has been illustrated and described with respect to specific embodiments of the apparatus and method thereof it will be understood that variations and modifications may be made in the form and arrangement of the several parts and elements thereof and in the repair procedure without departing from the spirit of the invention. The invention therefore is not to be limited to the particular structure and procedure herein shown and described nor in any manner that is inconsistent with the extent to which the progress in the art has been advanced by the invention.

I claim:

1. A method of repairing a tube structure having a defect in a portion of a tube thereof and having the exterior surface of the tube coated with a material that inhibits fusion joining, said tube having two sleeves of fusion-joinable material positioned thereon at locations spaced along the tube on opposite sides of the defect, each sleeve being fusion joined to the exterior surface of said tube by joints that are spaced along the tube so the surface portion of the tube covered by said sleeve is uncoated by said material that inhibits fusion joining, the steps of:

making a transverse cut between said joints of each sleeve through the sleeve and tube beneath the sleeve to separate said portion of the tube containing the defect from the remaining tube, removing the separated tube portion, removing remaining sleeve portions from the remaining tube to expose the uncoated exterior surface of the remaining tube that was beneath each sleeve, and fusion joining a replacement tube portion having a surface uncoated by said material to said uncoated exterior surfaces of said remaining tube.

2. The method of claim 1 including placing a sleeve of fusion-joinable material over each of the new joints between the replacement tube portion and the uncoated exterior surface of the remaining tube, and fusion joining each of said sleeves by spaced joints to the underlying uncoated exterior surfaces of said replacement tube portion, and remaining tube.

3. A method of making, using and repairing an apparatus embodying a tube structure that may be repaired after use by the removal of a section of tube thereof and fusion joining of a replacement section despite the fact that the tube strength is subjected to an environment that causes coating of the tube with a material that prevents fusion joining, which method comprises placing a sleeve of fusion-joinable material around a tube forming a part of said tube structure and fusion joining said sleeve to the exterior surface of said tube at spaced locations along said tube to seal from the environment that can cause coating of said tube in said apparatus the exterior surface of said tube covered by said sleeve, installing said tube structure in said apparatus, exposing the tube structure to an environment in said apparatus that causes formation of a coating on the tube that will inhibit attachment for repair of a tube length thereto by fusion joining, locating a defect in the tube, making a transverse cut between said joints of the sleeve through the sleeve and tube beneath the sleeve to separate said portion of the tube containing said defect from the remaining tube, removing the separated tube portion, removing a remaining sleeve portion from the remaining tube portion to expose the uncoated exterior surface of the remaining tube that was beneath the sleeve, and fusion joining a replacement tube portion having a surface uncoated by said material to said remaining tube.

4. The method of claim 3 in which two of said sleeves are placed around and fusion joined to said tube, transverse cuts are made through both of said sleeves and the tube beneath to separate the tube portion containing the defect from the remaining defect, and the separated tube portion is severed, and a replacement tube portion is fusion joined at its ends to the remaining tube at its uncoated exterior surfaces that were beneath the sleeves.

5. The method of claim 3 including placing a sleeve of fusion-joinable material over the new joint between the replacement tube portion and the uncoated exterior surface of the remaining tube, and fusion joining said sleeve by spaced joints to the underlying uncoated exterior surfaces of said replacement tube portion and remaining tube.

\* \* \* \* \*

PO-1050
(5/69)

UNITED STATES PATENT OFFICE
CERTIFICATE OF CORRECTION

Patent No. 3,638,684          Dated February 1, 1972

Inventor(s) Stanley J. Pavilon

It is certified that error appears in the above-identified patent and that said Letters Patent are hereby corrected as shown below:

Column 1, line 48, "manually" should be --usually--.

Column 3, line 26, "outer" should be --other--.

Column 4, line 24, "outer" should be --other--; "defection" should be --defective--; after "31" insert --was cut--.

line 41, "completely" should be --completing--.

Column 5, line 29, "strength" should be --structure--.

Signed and sealed this 22nd day of May 1973.

(SEAL)
Attest:

EDWARD M. FLETCHER, JR.
Attesting Officer

ROBERT GOTTSCHALK
Commissioner of Patents